(12) United States Patent
Arlabán Gabeiras et al.

(10) Patent No.: US 10,267,054 B2
(45) Date of Patent: Apr. 23, 2019

(54) PRECAST CONCRETE DOWEL, WIND TURBINE TOWER COMPRISING SAID DOWEL, WIND TURBINE COMPRISING SAID TOWER AND METHOD FOR ASSEMBLING SAID WIND TURBINE

(71) Applicant: ACCIONA WINDPOWER, S.A., Navarra (DE)

(72) Inventors: Teresa Arlabán Gabeiras, Navarra (ES); José Miguel García Sayés, Navarra (ES); Miguel Nuñez Polo, Navarra (ES); Alfonso Ruiz Aldama, Navarra (ES); Francisco Javier Sanz Corretge, Navarra (ES)

(73) Assignee: ACCIONA WINDPOWER, S.A., Navarra (ES)

( * ) Notice: Subject to any disclaimer, the term of this patent is extended or adjusted under 35 U.S.C. 154(b) by 113 days.

(21) Appl. No.: 14/134,974

(22) Filed: Dec. 19, 2013

(65) Prior Publication Data

US 2015/0096240 A1    Apr. 9, 2015

(30) Foreign Application Priority Data

Dec. 21, 2012 (ES) .................................. 201232003

(51) Int. Cl.
*E04H 12/34* (2006.01)
*F03D 13/10* (2016.01)
(Continued)

(52) U.S. Cl.
CPC ........... *E04H 12/342* (2013.01); *E04H 12/16* (2013.01); *F03D 13/10* (2016.05); *F03D 13/20* (2016.05);
(Continued)

(58) Field of Classification Search
CPC ......... E04H 12/24; E04H 12/12; E04H 12/16; E04H 12/342; F03D 1/001; F03D 11/04;
(Continued)

(56) References Cited

U.S. PATENT DOCUMENTS 3,501,881 A  *  3/1970  Van Buren ............ B28B 23/043
                                                    138/172
4,196,551 A  *  4/1980  Bondarenko ............. E04H 5/12
                                                    52/223.3

(Continued)

FOREIGN PATENT DOCUMENTS

DE            2744474 A1  *  4/1978  ............. E04B 1/215
FR            1440024 A   *  5/1966  ............... E04C 5/12
(Continued)

*Primary Examiner* — Patrick J Maestri
*Assistant Examiner* — Joseph J. Sadlon
(74) *Attorney, Agent, or Firm* — Womble Bond Dickinson (US) LLP

(57) ABSTRACT

It allows simplificating the assembling of a wind turbine (1). The dowels (4) comprise: a) an upper surface (5); b) a lower surface (6); c) an inner side surface (7); d) an outer side surface (8); e) at least an intermediate fixing surface (12), located in one of the outer (8) or inner (7) side surfaces, between the upper (5) and lower (6) surfaces; and f) at least a first grooved housing (13) made in that of the side surfaces (7, 8) comprising the intermediate fixing surface (12), where the first grooved housing (13) communicates the intermediate fixing surface (12) with one of the upper (5) and lower (6) surfaces and is configured to accommodate joining cables (23).

15 Claims, 8 Drawing Sheets

(51) Int. Cl.
  *E04H 12/16* (2006.01)
  *F03D 13/20* (2016.01)
(52) U.S. Cl.
  CPC ........ *F03D 13/22* (2016.05); *F05B 2240/912* (2013.01); *Y02E 10/728* (2013.01)
(58) Field of Classification Search
  CPC . F03D 11/045; F05B 2240/912; Y02E 10/728
  USPC .................................................. 52/40, 745.18
  See application file for complete search history.

(56) References Cited

U.S. PATENT DOCUMENTS

| | | | | |
|---|---|---|---|---|
| 4,504,174 | A * | 3/1985 | Barthel | E04B 1/22 405/252 |
| 4,637,186 | A * | 1/1987 | Ruigrok | E04H 17/20 144/24.13 |
| 4,850,777 | A * | 7/1989 | Lawrence et al. | 411/433 |
| 5,066,167 | A * | 11/1991 | Siegfried | E02B 9/06 405/150.1 |
| 5,533,835 | A * | 7/1996 | Angelette | E02D 27/42 405/229 |
| 5,678,382 | A * | 10/1997 | Naito | E02D 27/42 52/295 |
| 5,809,711 | A * | 9/1998 | Werner | E01D 2/00 52/223.2 |
| 6,651,394 | B2 * | 11/2003 | Hughes | E04H 9/02 277/646 |
| 7,160,085 | B2 * | 1/2007 | de Roest | E04H 12/085 416/244 R |
| 7,287,358 | B2 * | 10/2007 | Zambelli | E04B 1/21 52/223.13 |
| 7,765,764 | B2 * | 8/2010 | Zambelli | E04B 1/215 52/223.13 |
| 7,765,766 | B2 * | 8/2010 | Gomez | E04H 12/12 52/745.04 |
| 8,484,905 | B2 * | 7/2013 | Skjaerbaek et al. | 52/40 |
| 8,505,244 | B2 * | 8/2013 | Gomez | E04H 12/02 52/40 |
| 8,511,013 | B2 * | 8/2013 | Voss | E04O 5/07 52/223.5 |
| 8,938,931 | B2 * | 1/2015 | Ollgaard | E04H 12/085 52/745.18 |
| 9,518,564 | B2 * | 12/2016 | Dagher | B63B 5/14 |
| 9,669,497 | B2 * | 6/2017 | Gabeiras | B21K 3/04 |
| 2009/0000227 | A1 * | 1/2009 | Jakubowski | E04H 12/085 52/223.4 |
| 2009/0313913 | A1 * | 12/2009 | Malheiro De Aragao | E04H 12/12 52/40 |
| 2010/0126079 | A1 * | 5/2010 | Kristensen | B25B 13/02 52/40 |
| 2011/0239564 | A1 * | 10/2011 | Zheng | B29C 70/086 52/231 |
| 2013/0081350 | A1 * | 4/2013 | Bogl | E04H 12/08 52/651.01 |
| 2014/0033628 | A1 * | 2/2014 | Lockwood et al. | 52/223.5 |
| 2014/0298737 | A1 * | 10/2014 | Fernandez Gomez | E04H 12/12 52/220.1 |

FOREIGN PATENT DOCUMENTS

| | | | | |
|---|---|---|---|---|
| FR | 2545130 | A1 * | 11/1984 | E04C 5/12 |
| WO | WO 2008136717 | A1 * | 11/2008 | E04H 12/12 |

* cited by examiner

PRECAST CONCRETE DOWEL, WIND TURBINE TOWER COMPRISING SAID DOWEL, WIND TURBINE COMPRISING SAID TOWER AND METHOD FOR ASSEMBLING SAID WIND TURBINE

The present application is a non-provisional application claiming priority from Spanish Patent No. 201232003 filed Dec. 21, 2012.

OBJECT OF THE INVENTION

The present invention may be included in the technical field of wind power operation. In particular, the object of the invention refers to, according to a first aspect, a dowel configured in such a way that it enables simplification of the post-tensioning during assembly. According to a second aspect, the invention refers to a wind turbine tower comprising a plurality of said dowels; also according to a third aspect, the invention refers to a wind turbine comprising said tower. According to a fourth aspect, the invention refers to a method for assembling the wind turbine.

BACKGROUND OF THE INVENTION

The object of wind power consists of generating electricity from the wind by means of wind turbines with the maximum efficiency and the minimum cost possible. Said wind turbines consist basically of: a tower; a nacelle accommodating an electrical generator; and a rotor formed by at least two blades. The tower is in charge of supporting all the elements included in the nacelle and transmitting to the foundation all the reaction forces generated as a consequence of the different aerodynamic actions and operation conditions of the wind turbine.

Generally, given the high dimensions of the wind turbine and, consequently, of the tower, the tower is made by assembly of precast reinforced concrete modular sections called dowels.

In some structural solutions, the dowels are subject to a post-tensioning by means of a series of inner steel cables in order to improve their mechanical capacities. This post-tensioning causes each section of the dowels work (in most of the operating cases of the turbine) at a higher compression level, limiting the traction cases, taking the advantage of the fact that the concrete compressive strength is significantly higher than its tensile strength. Furthermore, the compression process tends to close any pre-existing cracking or fault in the concrete, thus limiting the progression of said cracking or fault through the concrete. According to what has been stated above, there is an interest in post-tensioning the dowels and the joints between the tower sections.

A first option, commonly used, to perform post-tensioning, is shown in FIGS. 3 and 4 of the US patent application US20120141295. Said figures show a so called "section post-tensioning", according to which, the tendons are housed in the dowels, so they have to pass through holes drilled in the dowels.

In this first option the assembly process is endangered since the cables have to be passed through a dowel towards the adjacent dowel, so that, given the high weight and dimensions of the dowels, manipulation thereof with respect to their positioning for that "threading" process, increases the assembly times of the wind turbine assembly.

A second option, also commonly used nowadays, to perform the above mentioned post-tensioning, comprises the use of steel cables, also referred to as tendons, which run longitudinally inside the tower, being those cables fixed to the tower foundation at an end, whereas at the other end they are fixed either to the upper part of a dowel or to a nacelle element referred to as upper flange.

The upper flange is usually made of steel and is fastened both to a yaw bearing (also referred to as nacelle upper bearing), and to nacelle driving sub-systems. Therefore, the task of post-tensioning the cables under these circumstances is an operation for which the space limitations imposed by said yaw bearing are critical.

On the other hand, the second option described implies the need to perform an effective pre-loading over the bigger dowels, located nearer the tower base, which implies the need of a bigger quantity of steel in the tendons, with respect to the post-tensioning section by section explained in the first option.

Therefore, performing a post-tensioning by sections implies a greater flexibility in terms of the cable sections and the number thereof, being possible to make an optimum use of said steel cables for each tower section.

However, said post-tensioning by sections poses the disadvantage of requiring a bigger number of operations of pre-loading of section cables, as well as the above reported inherent difficulty in manipulation of dowels (threading or insertion of the cables in the adjacent dowel housings).

DESCRIPTION OF THE INVENTION

The present invention solves the technical problem posed, by means of, according to a first aspect of the invention, a precast concrete dowel, configured in such a way that, as it will be explained below, it offers the possibility of being attached to an adjacent component in a simple way during the assembling work. According to a preferred embodiment of the invention, the dowel is a wind turbine dowel. According to a second aspect, the invention refers to a wind turbine tower comprising a plurality of said dowels; as well as, according to a third aspect, the invention refers to a wind turbine comprising said tower. According to a fourth aspect, the invention refers to a method for assembling the wind turbine.

The wind turbine comprises: a tower; a nacelle, supported by the tower and an electrical generator; and a rotor, comprising at least two blades and being connected to the electrical generator.

The dowels comprise and are delimited by an upper surface, a lower surface, an inner side surface and an outer side surface. Likewise, the dowels are characterized in that they additionally comprise:

- At least an intermediate fixing surface, located in one of the side surfaces, between the upper and lower surface, as well as
- At least a grooved housing made in one of the side surfaces, communicating the intermediate fixing surface with one of the upper or lower surfaces and being configured to accommodate joining cables.

Since the grooved housing is located through the dowel in a portion of the perimeter of the dowel, being either in the inner side surface or in the outer side surface, the process of joining the dowel to an adjacent component (which may as well be another dowel) during assembly is significantly simplified. This is achieved thanks to the joining cables from said adjacent component, generally steel cables, being easily accommodated in the dowel grooved housings without being required, as it is the case in the state of the art, to thread them by introducing them through holes and closed ducts drilled in the dowel end, until reaching the intermediate fixing surface on which joining cables are fixed by means of load sharing elements and fixing elements.

In particular, in the case of wind turbine dowels, the presence of the grooved housing in a dowel enables said dowel to be fixed to at least one of the following components of the wind turbine provided with joining cables, for example steel tendons:

- an adjacent dowel, either adjacent above or adjacent below;
- a foundation intended to support a wind turbine (tower, nacelle and rotor), in case that the dowel occupies an end position in the lower part of the tower;
- an upper flange intended to connect the tower with the nacelle, in case that the first dowel occupies an outer position in the upper part of the tower; or
- a bearing race, which belongs to an orientation system of the nacelle, and situated on the upper flange.

As it has been mentioned above, the invention refers to, according to a second aspect, a wind turbine tower incorporating a plurality of dowels as those previously described.

According to a third aspect, the invention refers to a wind turbine comprising the tower previously described.

According to a fourth aspect of the invention, a method for assembling the wind turbine is described, comprising a stage of fixing the dowels, which enables either a post-tensioning of the dowels per section in a simplified way, or a simple joining between sections in a simplified way (in case that pre-tensioned dowels are used).

The stage of fixing the dowels comprises a first step by means of which the joining cables joining the component to the dowel are separated from an area of access to said component, by fastening them to the dowels (preferably to any of the side surfaces) with a provisional fastening means, such as a strap or similar.

Subsequently, in a second step, the dowel is brought near the component. Since the joining cables have been separated in the first step, there is no risk for those joining cables to be trapped by the dowel during the second step. Preferably, an additional step may be included, wherein the dowel is supported on the foundation or on an adjacent lower dowel, when the component is the foundation itself or an adjacent upper or lower dowel.

Then, according to a third step, the provisional fastening means is removed and the joining cables, generally steel tendons, are accommodated in their respective grooved housings. Optionally, the joining cables may be additionally pre-loaded using traction means and load sharing elements, to share the load, such as plates. Thus, a post-tensioning in the dowels is achieved.

Alternatively, in case of using pre-tensioned dowels (in which a pre-load (or a pre-tension) is generated previously to assembly with the other components) the joining cables are only used to join adjacent components without generating the post-tensioning effect mentioned above.

Optionally, after the second step, of supporting, mortar may be poured so as to attach the dowel to the component, especially in case the component is another dowel. Once the mortar has cured, the provisional fastening means is removed. This step is not necessary in case of using 'dry' joints.

DESCRIPTION OF THE DRAWINGS

To implement the present description and in order to provide a better understanding of the characteristics of the invention, according to a preferred embodiment thereof, a set of drawings is attached as part of this description, with an illustrative but not limitative purpose, which represents the following.

PREFERRED EMBODIMENT OF THE INVENTION

The following is a detailed description of a preferred embodiment of the invention, referring to FIGS. 1 to 8 mentioned above.

Figure 1:
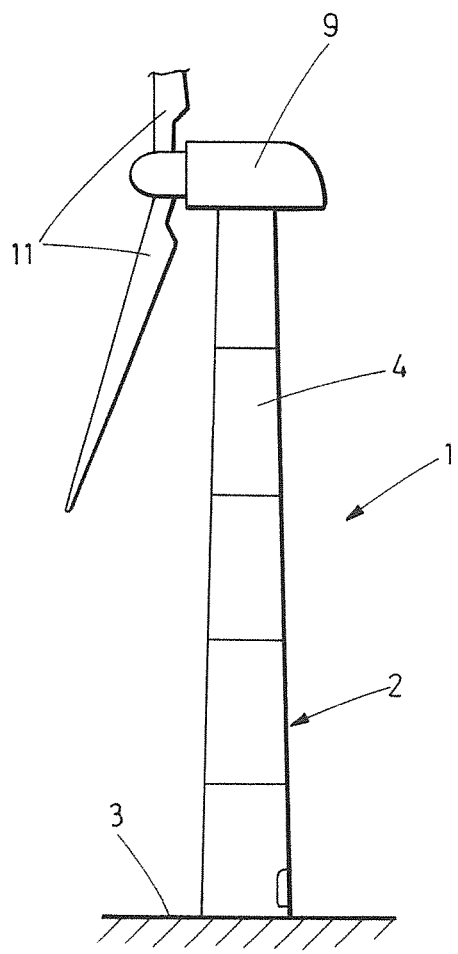
FIG. 1.—It shows a side view of a wind turbine comprising dowels according to the invention.
Figure 2:
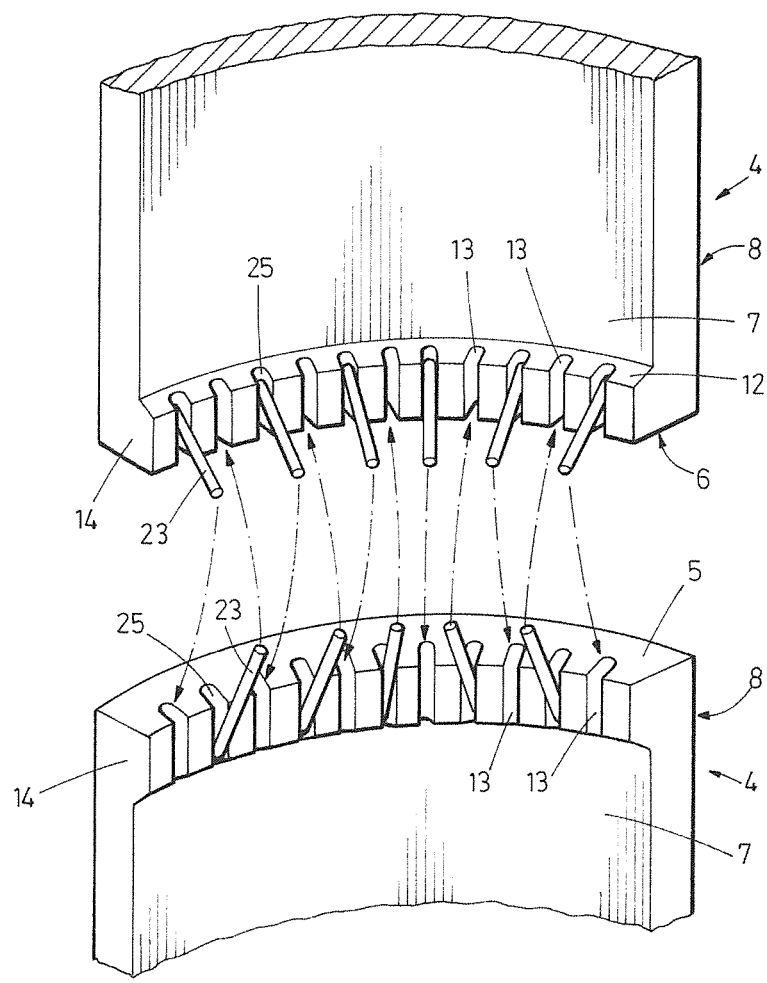
FIG. 2.—It shows a perspective view of an embodiment in which the dowels have first grooved housings and ducts to accommodate joining cables.
Figure 3:
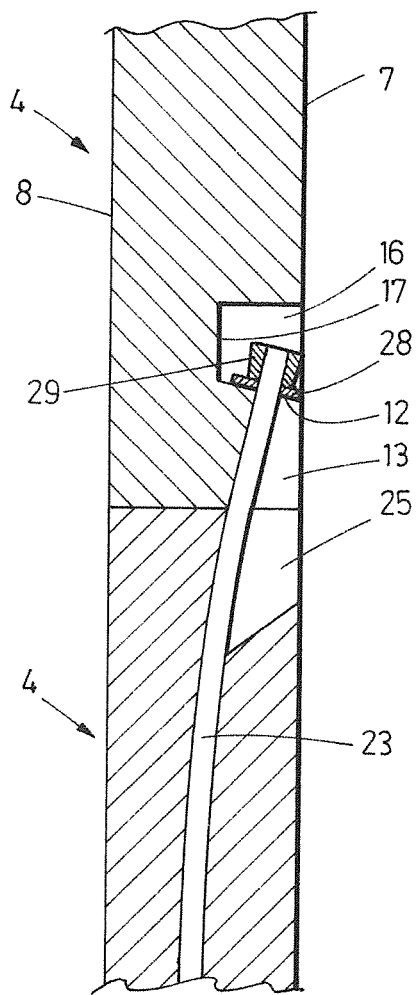
FIG. 3.—It shows a sectional view of the joint between two dowels not being provided with any protuberance.
Figure 4:
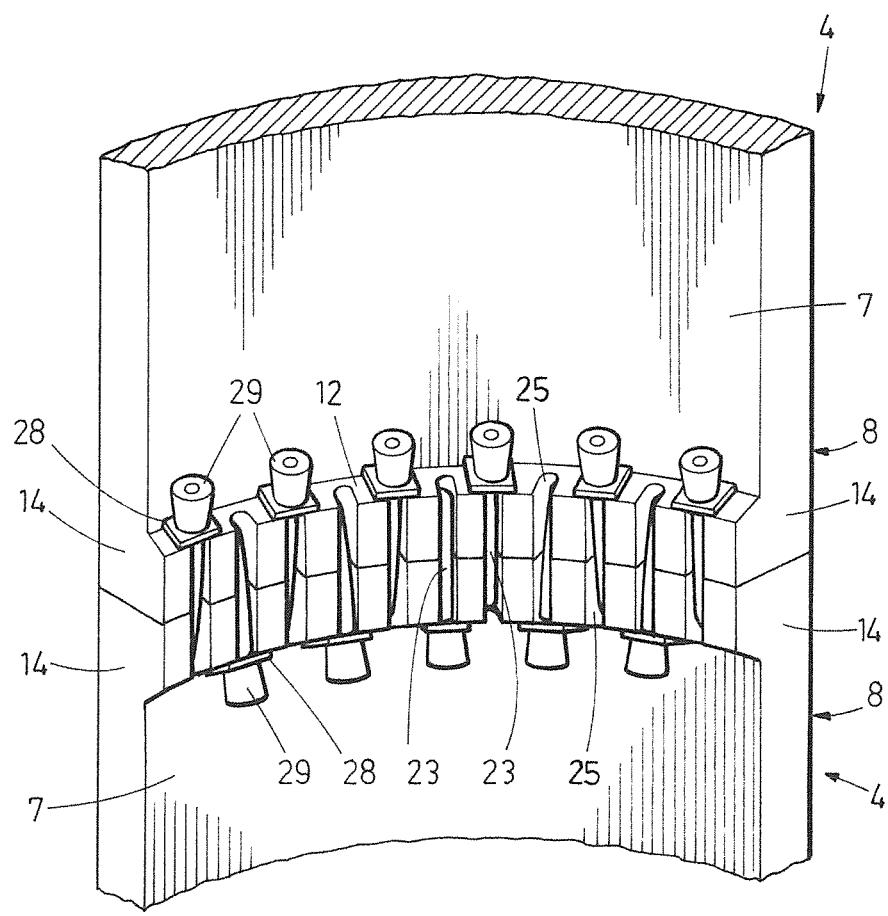
FIG. 4.—It shows a detailed view of the fixing between the joining cables and the first grooved housings.
Figure 5:
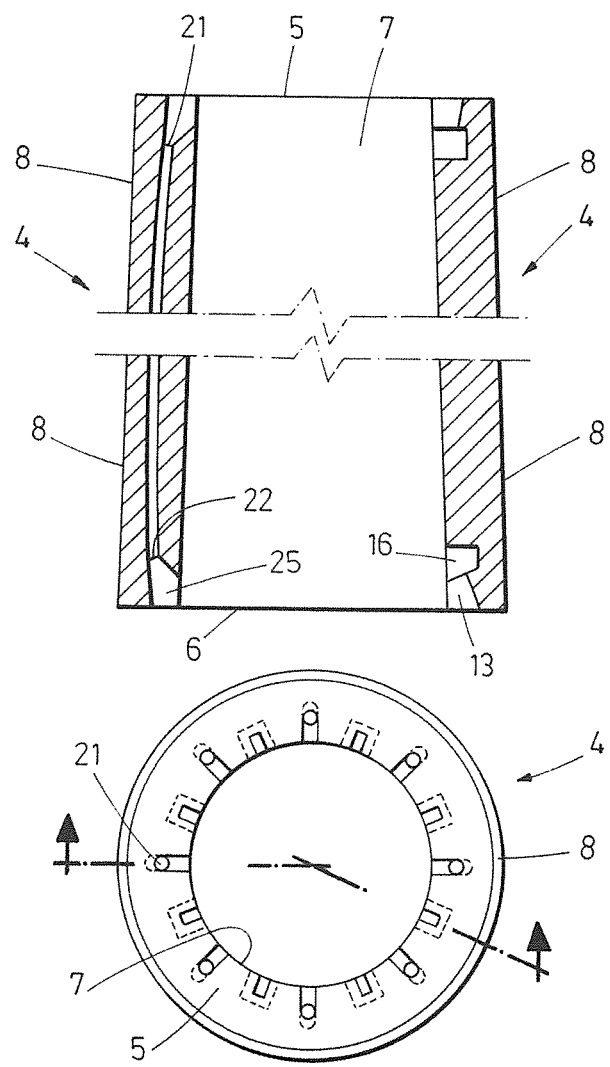
FIG. 5.—It shows a plan and elevation view in which a dowel can be seen comprising ducts as well as first and second grooved housings.
Figures 6A, 6B:
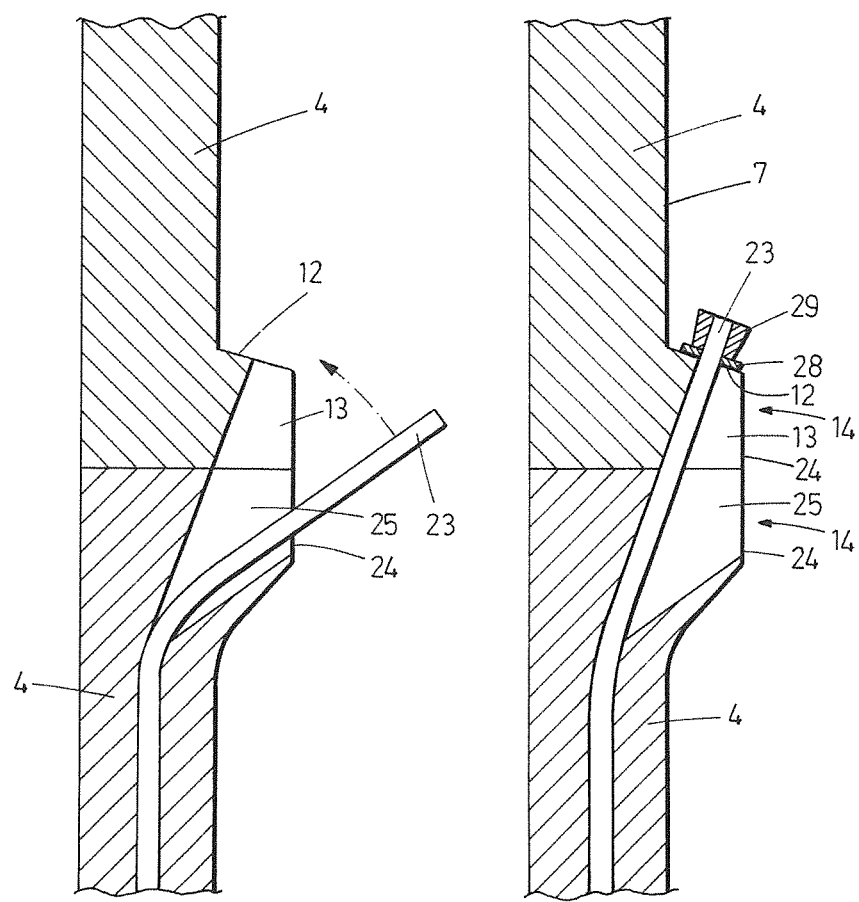
FIGS. 6a and 6b.—Show the steps of: accommodating the joining cables in the first grooved housings; and fixing the joining cables to the dowel.

FIG. 1 shows a wind turbine (1) comprising:
- a tower (2), supported on a founding (3) to which it is intended to transmit stresses, wherein the tower (2) comprises precast concrete dowels (4) and which are assembled to each other, the dowels (4) comprising, as it can be seen in FIGS. 2 and 3:
  - an upper surface (5),
  - a lower surface (6),
  - an inner side surface (7), and
  - an outer side surface (8);
- a nacelle (9) fixed on the tower;
- an electrical generator (not shown) accommodated in the nacelle (9);
- a rotor formed by at least two blades (11), and connected to the generator.

The dowels additionally comprise:
- at least an intermediate fixing surface (12), located in one of the side surfaces (7, 8), between the upper (5) and lower (6) surfaces, and
- at least a first grooved housing (13) made in said side surface (7, 8), for communicating the intermediate fixing surface (12) with one of the upper (5) and lower (6) surfaces.

By means of the dowels (4) provided with first grooved housings (13), according to what has just been described, it is possible to simplify the process of fixing a dowel (4) to several components of the wind turbine, such as the foundation (3), an upper flange (19) of the nacelle (9), and other upper or lower adjacent dowels (4), as well as the process of joining said dowels (4) to said components and, in case of solutions with post-tensioned dowels (4), the subsequent post-tensioning of the dowel (4).

The dowels (4) may have, as it is well known, a rotational shape such as a cylindrical crown, (or having a crown section). Additionally, the dowels (4) may comprise, in any (or in both) of their inner (7) and outer (8) side surfaces, near the upper surface (5) and/or the lower surface (6), a protuberance (14), in such a way that the distance between the inner (7) and outer (8) side surfaces, that is, the dowel (4) thickness, is higher in said protuberance (14) than in the rest of the dowel (4).

In the case of dowels (4) provided with a protuberance (14), the intermediate fixing surface (12) may be defined, as it is shown in FIGS. 2, 4, 6a and 6b, by a first face of the protuberance (14). Preferably, although not exclusively, in dowels (4) of an even thickness, as it is shown in FIG. 3, the dowel (4) may include a first cavity (16) near the upper surface (5) or the lower surface (6), the width of the first cavity (16) being greater than the first grooved housings (13) and where the intermediate fixing surface (12) falls within said first cavity (16).

The above considerations, in respect of defining the intermediate fixing surfaces (12) in dowels (4) provided with protuberances (14) and/or in dowels (4) of substantially even thickness, are valid both for cases in which the protuberance (14) and/or the first cavity (16) are made in the inner side surface (7), and for cases in which they are made in the outer side surface (8).

The first grooved housings (13) which are located near the upper surface (5), allow connection of the dowel (4) with the upper flange (19) or with another dowel (4) which is adjacent above; whereas first grooved housings (13) which are located near the lower surface (6), allow connection of the dowel (4) with the foundation (3) or with another dowel (4) which is adjacent below.

The dowel (4) according to the invention may additionally comprise, according to what has been explained in the background art section, inner ducts, preferably longitudinal, which run between an inlet (21) hole and an outlet (22) hole, and configured to accommodate joining cables (23), particularly, steel cables, configured in turn to generate post-tensioning of the dowel (4).

A dowel (4) lacking the mentioned ducts may receive, as it has been explained before, in its first grooved housings (13), the joining cables (23) from other components of the wind turbine (1), as for example other dowels (4).

A dowel (4) including the ducts may accommodate its joining cables (23) within said ducts, and also in grooved housings (13, 26, 27) incorporated in another component of the wind turbine (1), as for example, another dowel (4) for them to be joined to said component. Using dowels (4) which incorporate both first grooved housings (13) and ducts to accommodate joining cables (23), it is possible to perform a more homogeneous post-tensioning, since, preferably, the grooved housings (13) and the ducts are arranged alternately, thus allowing that, along the perimeter of the dowel (4), joining cables (23), projecting from the dowel (4) in question, to be joined with a component located above or below, alternate with other joining cables (23) from another dowel (4) located upwards or downwards and accommodated in the first grooved housings (13) of the dowel (4).

Preferably, ducts and first grooved housings (13) are configured in such a way that, in two dowels (4) which are adjacent, the ducts and the first grooved housings (13) are collinear, such that the joining cables (23) are prevented to rest on angular surfaces which can provide a strain concentration effect.

For any of the examples described, the intermediate fixing surface (12) and the corresponding side surface (7, 8) may have several relative orientations. In particular, two orientations are preferred. A first preferred orientation implies that the intermediate fixing surface (12) forms a substantially right angle with the corresponding side surface (7, 8), which is favourable in the sense that it facilitates accomplishment of the first grooved housing (13). A second orientation preferably implies that the intermediate fixing surface (12) forms an angle different to 90° with the corresponding side surface (7, 8), which is favourable in the sense that it provides an appropriate angle to achieve the settlement of the load sharing elements thereon so as to join the joining cables (23).

In particular, one of the faces of the first grooved housings (13) is inclined towards the inner side surface (7) of the dowel, and forms a 90° angle with respect to the intermediate fixing surface (12), so that the first grooved housings (13) are delimited by surfaces which are perpendicular to the intermediate fixing surface (12). This facilitates a support for said joining cables (23) on said inclined face in such a way that there are no edges contacting the joining cables (23) which may cause a strain concentration in the area and endanger the integrity of the assembly.

The invention additionally refers to a method for assembling a wind turbine (1), comprising the following steps:

A first step by means of which the joining cables (23) of the component are separated from an access area to said component by fastening the joining cables (23) with a provisional fastening means, such as a strap or similar (not shown).

Then, a second step, in which the dowel (4) is butt supported on the component. Since the joining cables (23) have been separated in the first step, there is no risk for the joining cables (23) to be trapped by the dowel (4) during the second step.

Afterwards, a third step, in which the provisional fastening means is removed, and the joining cables (23) are firstly accommodated in the first grooved housings (13) and, then, fixed to the dowel (4).

Optionally, the method comprises a post-tensioning step in which the joining cables (23) are, as well as fixed to the dowel (4), pre-loaded using traction means (not shown), as well as load sharing elements, such as plates (28), which are configured to rest on the intermediate fixing surface (12) to share the load.

Optionally, after the second step, of supporting, the provisional fastening means is removed from the joining cables (23), accommodating said supporting cables (23) in first grooved housings (13) and subsequently fixing the joining cables (23), to the intermediate fixing surface (12) of the adjacent dowel (4). Mortar may be poured so as to join the dowel (4) to the component, particularly in the case that the component is a dowel (4) adjacent above or below, or the foundation (3). This step is not necessary in case of using 'dry' joints.

In order to facilitate performance of the second step, of supporting, the inlet (21) and/or the outlet (22) holes for the joining cables (23) may be located, at least partially, preferably completely, outside the upper surface (5) or the lower surface (6), correspondingly. As embodiment examples, it is shown that in the case of dowels (4) provided with protuberances (14), the inlet (21) and/or the outlet (22) holes are inside second grooved housings (25) made on the side surface (7, 8) in which the first grooved housings (13) are made, until they intersect with the ducts, so that the joining cables (23) may be separated from the side surface (7, 8) in which the first grooved housings (13) and second grooved housings (25) are made. In the case of dowels (4) provided with a first cavity (16), the inlet (21) and/or the outlet (22) holes are, either in the inner side surface (7) or in the outer side surface (8), accordingly. In a preferred embodiment, the dowel (4) may additionally comprise, in the inner side surface (7) or in the outer side surface (8), accordingly, preferably in the side surface (7, 8) in which the first grooved housings are made (13), a second grooved housing (25) communicated with one of the ducts through said inlet (21) and/or outlet (22) holes. Therefore, the upper surface (5) and/or the lower surface, accordingly, are free of inlet (21) and outer (22) holes, and therefore a possible trapping of the joining cables (23) is prevented, simplifying the realization of the second step, of supporting.

Figure 7:
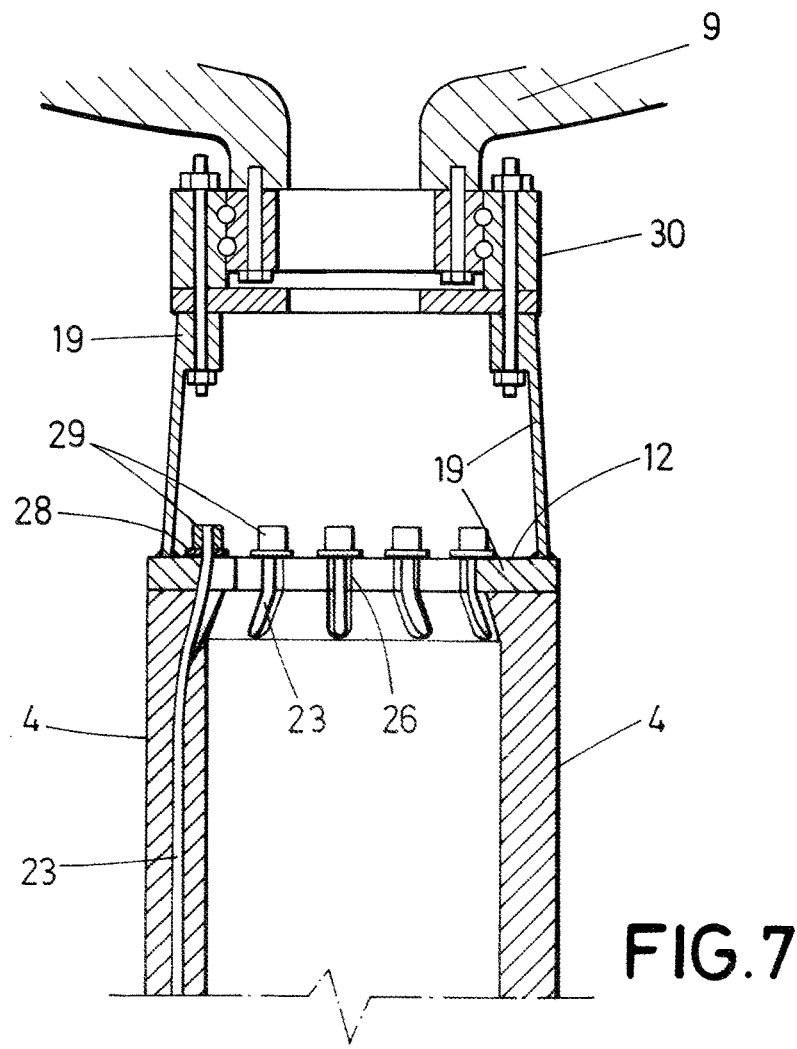
FIG. 7.—It shows a schematic view of the fixing between the upper flange, that consists of a metallic adapter, of a wind turbine nacelle and a dowel provided with ducts to accommodate joining cables.
Figure 8:
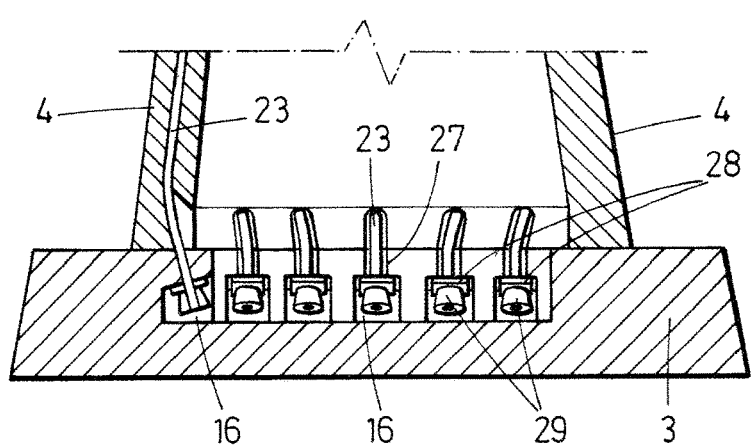
FIG. 8.—It shows a schematic view of the foundation fixing, intended to support a wind turbine, to a wind turbine dowel provided with ducts in which joining cables are accommodated.
Figure 9:
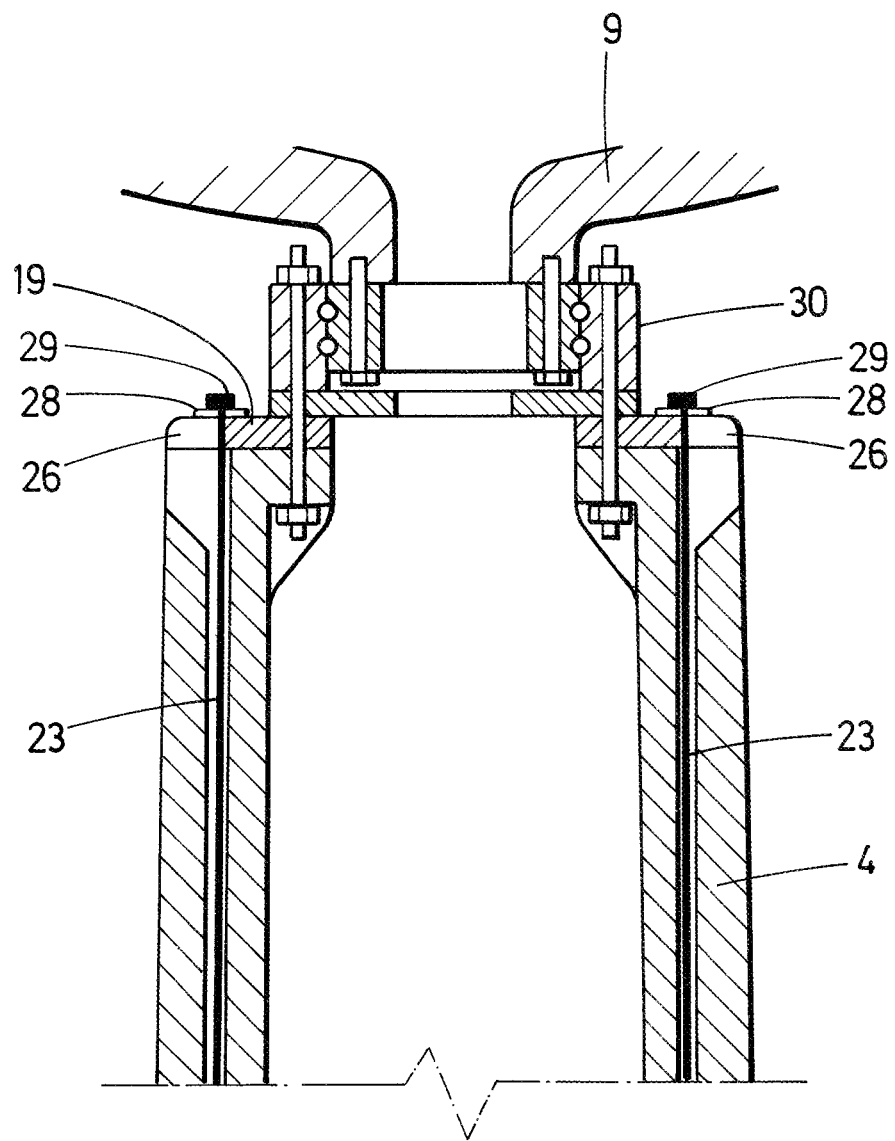
FIG. 9.—It shows a schematic view of the fixing of the nacelle to a dowel according to the present invention, via an upper flange, consisting of a load sharing disc, for connecting the dowel to a yaw bearing.

FIGS. 7-8 illustrate the connection of a dowel (4) with the foundation (3) and with the upper flange (19), where the joining cables (23) comprise a first end fixed respectively to the foundation (3), see FIG. 8, or to the upper flange (19), see FIGS. 7 and 9. In the case it being fixed to the foundation (3), the joining cable (23) may be separated, according to the method described, subsequently the dowel (4) is supported on the foundation (3) and, finally, the joining cable (23) is inserted in one of the first grooved housings (13) of the lower surface (6) of the dowel (4). For the case of the upper flange (19), once the dowel (4) is resting on an adjacent lower dowel (4), it would only be necessary to insert the joining cable (23) in one of the first grooved housings (13), located in the upper surface (5) of the dowel (4). In both cases, the process is finished pre-loading the joining cable (23) and subsequently fixing said joining cable (23), as it has been described above.

Alternately to what it has just been explained, the dowel (4) incorporates ducts accommodating the joining cables (23), but said dowel (4) not necessarily comprises first grooved housings (13), but instead the upper flange (19) or the foundation (3) respectively incorporate third grooved housings (26) or fourth grooved housings (27) configured to accommodate the joining cables (23) of the dowel (4).

By upper flange (19) it is understood a metallic interface between the concrete tower (2) and the yaw bearing (30). Said upper flange (19) may consist of a metallic adapter, either casting or forging, like the one shown on FIG. 7, or a load sharing disc, like the one shown on FIG. 9. The upper flange (19) comprises third grooved housings (26) for the insertion of joining cables (23) from an adjacent lower dowel (4).

For the case referred to a dowel (4) connecting to the foundation (3) provided with fourth grooved housings (27), the step of fixing a dowel (4) to an adjacent component of the assembling method, as it has been described above, comprises: separating the joining cables (23); bringing the dowel near the foundation (3), release the joining cables (23) and insert the joining cables (23) in the fourth grooved housings (27) located for this purpose in the foundation (3). Optionally, mortar is applied to the space between dowel (4) and foundation (3) and the mortar is left to cure. Finally, and after mortar is cured, a step of post-tensioning the joining cables (23) is carried out.

For the case of connecting a dowel (4) to an upper flange (19) provided with third grooved housings (26), firstly the joining cables are separated (23), although they may be previously removed, for example, before connecting the dowel (4) with the lower adjacent dowel (4); then, the dowel (4) is brought near the upper flange (19), although generally this step is previously carried out during the assembling of the nacelle (9); afterwards, the joining cables (23) are released; finally, said joining cables (23) are inserted in the third grooved housings (26) located for this purpose in the upper flange (19), and then the joining cables (23) are pre-loaded.

As shown in FIGS. 3-9, fixing elements (29) may be used for fixing the joining cables (23) to the adjacent dowel (4), the upper flange (19) or foundation (3), as the case may be; as well as load sharing elements (28) may be used for being compressed by the fixing elements (29) against the intermediate fixing surface (12), for evenly distributing strain on the intermediate fixing surface (12). Preferably, the fixing elements (29) may comprise conical bodies, as well as the load sharing elements (28) may comprise load sharing plates.

A good settlement of the fixing elements (29) is made easier by the fact that, as explained above, one of the faces of the first grooved housings (13) is inclined towards the inner, forming a right angle with the intermediate fixing surface (12), such that the first grooved housings (13) are limited by surfaces which are perpendicular to the intermediate fixing surface (12).

The invention claimed is:
1. A precast concrete dowel comprising:
   an upper surface,
   a lower surface,
   an inner side surface, and
   an outer side surface;
   the dowel further comprising:
   at least an intermediate fixing surface, located in one of the side surfaces, between the upper and lower surfaces,
   at least a first groove made in the side surface comprising the intermediate fixing surface, wherein the first groove communicates the intermediate fixing surface with one of the upper and lower surfaces and is configured to accommodate joining cables;
   at least an inner longitudinal duct which runs inside the dowel between an inlet hole and an outlet hole, and
   joining cables configured to join the dowel, and which are accommodated in at least a duct;
   wherein the inlet hole and/or the outlet hole are inside a second groove communicating the inner side surface or the outer side surface with one of the upper or lower surfaces, the second groove being configured to accommodate the joining cables.

2. The dowel of claim 1, further comprising a protuberance located near the upper surface or the lower surface comprising the first groove, in such a way that the dowel has a distance between the inner and outer side surfaces which is bigger in the protuberance than in the rest of the dowel, wherein the intermediate fixing surface lies within a first face of the protuberance.

3. The dowel of claim 1, further comprising a first cavity which intercepts one of the inner or outer side surfaces, wherein the first cavity is limited at least by the intermediate fixing surface, and the width of the first cavity is bigger than the width of the first groove.

4. The dowel of claim 1, wherein the intermediate fixing surface forms an angle different to 90° from the corresponding side surface.

5. The dowel of claim 1, comprising a plurality of ducts and a plurality of first grooves, wherein at least one of the first grooves is arranged between two adjacent ducts.

6. The dowel of claim 1, wherein the inlet hole and/or outlet hole are located, at least partially, on the outside of the upper or lower surface comprising the plurality of first grooves.

7. The dowel of claim 1, wherein the inlet hole and/or the outlet hole are in the inner side surface.

8. A wind turbine tower comprising a plurality of dowels, wherein the plurality of dowels comprises the dowel described in claim 1, and wherein between two adjacent dowels, a plurality of ducts from one of the dowels and a plurality of first grooves of the adjacent dowel are collinear.

9. The wind turbine tower of claim 8, further comprising:
fixing elements intended to provide a fixing between the joining cables from one dowel, and the intermediate fixing surface of the adjacent dowel; and
load sharing elements located on the intermediate fixing surface on which the fixing elements are located, the load sharing elements being pressed by the fixing elements, for evenly distributing strain on the intermediate fixing surface.

10. A wind turbine comprising the tower described in claim 9.

11. The wind turbine of claim 10, further incorporating a nacelle comprising an upper flange for connecting the nacelle to the tower, wherein the upper flange is provided with third grooves to accommodate the joining cables of a dowel.

12. The wind turbine of claim 10, further incorporating a foundation comprising fourth grooves to accommodate the joining cables of a dowel.

13. The wind turbine of claim 10 further comprising:
fixing elements intended to provide fixing between the joining cables from a dowel and the intermediate fixing surface; and
load sharing elements located on the intermediate fixing surface, and pressed by the fixing elements, to evenly distribute the stresses of the joining cables on the intermediate fixing surface,
wherein the fixing elements and the load sharing elements are configured so as to fix the joining cables of at least a dowel, in such a way that they are arranged over a fixing surface located either in a second dowel or in the upper flange or in the foundation.

14. The precast concrete dowel of claim 1, wherein the dowel comprises a dowel body, and wherein the upper surface, the lower surface, the inner side surface, the outer side surface, the at least one intermediate fixing surface and the at least one first groove are comprised on the dowel body.

15. A method for assembling a wind turbine, comprising a stage of fixing a dowel as described in claim 1 to a component of the wind turbine selected from a list consisting of:
an upper flange;
a foundation; and
an adjacent dowel;
wherein the stage of fixing a dowel to a component of the wind turbine comprises the following steps:
separating the joining cables from an area of access to said component, additionally fastening said joining cables with provisional fastening means,
bring the dowel near the component;
release the provisional fastening means;
accommodate the joining cables in grooved housings of the component; and
fixing the joining cables using the fixing elements.

* * * * *